United States Patent
Yum et al.

(10) Patent No.: US 11,595,167 B2
(45) Date of Patent: Feb. 28, 2023

(54) METHOD AND DEVICE FOR REPORTING CHANNEL STATE IN WIRELESS COMMUNICATION SYSTEM

(71) Applicant: LG Electronics Inc., Seoul (KR)

(72) Inventors: Kunil Yum, Seoul (KR); Jiwon Kang, Seoul (KR); Kijun Kim, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 148 days.

(21) Appl. No.: 16/625,375

(22) PCT Filed: Jun. 22, 2018

(86) PCT No.: PCT/KR2018/007073
§ 371 (c)(1),
(2) Date: Dec. 20, 2019

(87) PCT Pub. No.: WO2018/236180
PCT Pub. Date: Dec. 27, 2018

(65) Prior Publication Data
US 2021/0409174 A1 Dec. 30, 2021

Related U.S. Application Data

(60) Provisional application No. 62/557,094, filed on Sep. 11, 2017, provisional application No. 62/523,739, filed on Jun. 22, 2017.

(51) Int. Cl.
*H04L 5/00* (2006.01)
*H04L 25/02* (2006.01)

(52) U.S. Cl.
CPC ........ *H04L 5/0048* (2013.01); *H04L 25/0202* (2013.01)

(58) Field of Classification Search
CPC ........ H04B 17/345; H04B 17/24; H04B 7/06; H04L 5/0098; H04L 25/0202; H04L 5/0048; H04W 24/10
See application file for complete search history.

(56) References Cited

U.S. PATENT DOCUMENTS

| | | | |
|---|---|---|---|
| 2016/0323901 A1 | 11/2016 | Yum et al. | |
| 2017/0245165 A1* | 8/2017 | Onggosanusi | ........ H04L 5/0057 |
| 2018/0288746 A1* | 10/2018 | Zhang | .................. H04L 5/0048 |

(Continued)

FOREIGN PATENT DOCUMENTS

| | | |
|---|---|---|
| CN | 102845009 | 12/2012 |
| CN | 103460634 | 12/2013 |

(Continued)

OTHER PUBLICATIONS

EP Extended European Search Report in European Appln. No. 18820435.8, dated Mar. 2, 2021, 8 pages.

(Continued)

*Primary Examiner* — Mansour Oveissi
(74) *Attorney, Agent, or Firm* — Fish & Richardson P.C.

(57) ABSTRACT

A method for reporting a channel state in a wireless communication system according to an embodiment of the present disclosure may comprise the steps of: receiving a channel state report setting including an index of a first bandwidth part (BWP); receiving a trigger of a channel state report for a second BWP other than the first BWP; measuring a channel state in the second BWP in a measurement gap according to the trigger; and transmitting the measured channel state to a base station on an available uplink resource within a first activated BWP after the measurement gap.

14 Claims, 14 Drawing Sheets

(56) References Cited

U.S. PATENT DOCUMENTS

| | | | |
|---|---|---|---|
| 2019/0215130 A1* | 7/2019 | Aiba | H04L 5/0048 |
| 2021/0111851 A1* | 4/2021 | Lin | H04W 24/10 |

FOREIGN PATENT DOCUMENTS

| | | |
|---|---|---|
| CN | 103650403 | 3/2014 |
| KR | 20120096475 | 8/2012 |
| KR | 101205482 | 11/2012 |
| KR | 20140123486 | 10/2014 |
| KR | 101489775 | 2/2015 |
| KR | 20150032696 | 3/2015 |
| KR | 20150095501 | 8/2015 |
| KR | 20160093533 | 8/2016 |
| KR | 20160103556 | 9/2016 |
| KR | 20160128401 | 11/2016 |
| WO | WO 2017/034147 | 3/2017 |
| WO | WO2017059829 | 4/2017 |

OTHER PUBLICATIONS

ZTE, "Further considerations on CSI feedback for MTC enhancement," R1-156667, 3GPP TSG RAN WG1 Meeting #83, Anaheim, US, dated Nov. 15-22, 2015, 8 pages.

Korean Notice of Allowance in Korean Appln. No. 10-2019-7035329, dated Aug. 26, 2020, 9 pages (with English translation).

Ericsson, "On partial bands and CSI acquisition," R1-1711038, 3GPP TSG-RAN WG1 NR Ad-Hoc#2, Qingdao, China, dated Jun. 27-30, 2017, 3 pages.

LG Electronics, "Remaining details on wider bandwidth operation," R1-1710352, 3GPP TSG RAN WG1 Meeting Ad-Hoc, Qingdao, P.R. China, dated Jun. 27-30, 2017, 9 pages.

MediaTek Inc., "Further Details on Wider Bandwidth Operations in NR," R1-17010796, 3GPP TSG RAN WG1 NR Ad-Hoc#2, 3GPP TSG RAN WG1 NR Ad-Hoc#2, dated Jun. 27-30, 2017, 7 pages.

PCT International Search Report and Written Opinion in International Application No. PCT/KR2018/007073, dated Oct. 12, 2018, 16 pages (with English translation).

Samsung, "Discussions on CSI measurements and reporting for NR," R1-1710668, 3GPP TSG RAN WG1 NR Ad-Hoc#2, Qingdao, P.R. China, dated Jun. 27-30, 2017, 7 pages.

Huawei & HiSilicon, "Overview of wider bandwidth operations," R1-1709972, Presented at 3GPP TSG RAN WG1 NR Ad Hoc Meeting, Qingdao, China, Jun. 27-30, 2017, 9 pages.

MediaTek Inc., "Discussion on UE measurement capability," R4-1706547, Presented at 3GPP TSG-RAN WG4 NR AH Meeting #2, Qingdao, China, Jun. 27-29, 2017, 7 pages.

MediaTek Inc., "Further Details on Wider Bandwidth Operations in NR," R1-17010796, Presented at 3GPP TSG RAN WG1 NR Ad-Hoc#2, Qingdao, P.R. China, Jun. 27-30, 2017, 7 pages.

Office Action in Chinese Appln. No. 201880040978.7, dated Jan. 9, 2023, 14 pages (with English translation).

\* cited by examiner

METHOD AND DEVICE FOR REPORTING CHANNEL STATE IN WIRELESS COMMUNICATION SYSTEM

CROSS-REFERENCE TO RELATED APPLICATIONS

This application is a National Stage application under 35 U.S.C. § 371 of International Application No. PCT/KR2018/007073, filed on Jun. 22, 2018, which claims the benefit of U.S. Provisional Application No. 62/557,094, filed on Sep. 11, 2017, and U.S. Provisional Application No. 62/523,739, filed on Jun. 22, 2017. The disclosures of the prior applications are incorporated by reference in their entirety.

TECHNICAL FIELD

The present disclosure relates to a wireless communication system, and more particularly, to a method for reporting a channel state and apparatus therefor.

BACKGROUND ART

The necessity for mobile broadband communication much improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low latency communication (URLLC), etc. has been discussed. In the present disclosure, the corresponding technology is referred to as new RAT for convenience of description.

DISCLOSURE OF THE INVENTION

Technical Task

The technical task of the present disclosure is to propose a method for reporting a channel state.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solutions

In one technical aspect of the present disclosure, provided herein is a method of reporting a channel state in a wireless communication system, the method including receiving a channel state report configuration including an index of a first BandWidth Part (BWP), receiving a trigger of a channel state report not on the first BWP but on a second BWP, measuring the channel state on the second BWP in a measurement gap according to the trigger, and transmitting the measured channel state on an available uplink resource within a first activated BWP after the measurement gap to a base station.

Additionally or alternatively, the method may further include receiving information related to the measurement gap from the base station, wherein the measurement gap is defined by a frequency resource within a slot, a period/slot offset, or a slot length.

Additionally or alternatively, the measurement gap may include a first measurement gap after reception of the trigger among preset periodic or semi-persistent measurement gaps.

Additionally or alternatively, wherein based on the measurement cap including a semi-persistent measurement gap, the semi-persistent measurement gap may be enabled or disabled by signaling.

Additionally or alternatively, the trigger of the channel state report on the second BWP may include a signaling for designating a measurement of the channel state within the measurement gap.

Additionally or alternatively, the trigger of the channel state report on the second BWP may include downlink control information received in the measurement gap configured slot.

Additionally or alternatively, the channel state report configuration may include a start RB index and an end RB index of the first BWP.

In another technical aspect of the present disclosure, provided herein is a user equipment performing a channel state report in a wireless communication system, the user equipment including a transmitter, a receiver, and a processor configured to control the transmitter and the receiver, wherein the processor is further configured to receive a channel state report configuration including an index of a first BandWidth Part (BWP), receive a trigger of a channel state report not on the first BWP but on a second BWP, measure the channel state on the second BWP in a measurement gap according to the trigger; and transmit the measured channel state on an available uplink resource within a first activated BWP after the measurement gap to a base station.

Additionally or alternatively, the user equipment may further include receiving information related to the measurement gap from the base station, and the measurement gap may be defined by a frequency resource within a slot, a period/slot offset, or a slot length.

Additionally or alternatively, the measurement gap may include a first measurement gap after reception of the trigger among preset periodic or semi-persistent measurement gaps.

Additionally or alternatively, based on the measurement cap including a semi-persistent measurement gap, the semi-persistent measurement gap may be enabled or disabled by signaling.

Additionally or alternatively, the trigger of the channel state report on the second BWP may include a signaling for designating a measurement of the channel state within the measurement gap.

Additionally or alternatively, the trigger of the channel state report on the second BWP may include downlink control information received in the measurement gap configured slot.

Additionally or alternatively, the channel state report configuration may include a start RB index and an end RB index of the first BWP.

[0018.1] Additionally or alternatively, the UE is a part of an autonomous driving device that communicates with at least one of a network or another autonomous driving vehicle.

The above technical solutions are merely some parts of embodiments of the present disclosure, and various embodiments reflecting the technical features of the present disclosure can be derived and understood by those skilled in the art based on the following detailed description of the present disclosure.

Advantageous Effects

According to embodiments of the present disclosure, channel state reporting can be efficiently processed.

Effects obtainable from the present disclosure are non-limited by the above mentioned effect. And, other unmentioned effects can be clearly understood from the following description by those having ordinary skill in the technical field to which the present disclosure pertains.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE FOR INVENTION

Figure 1:
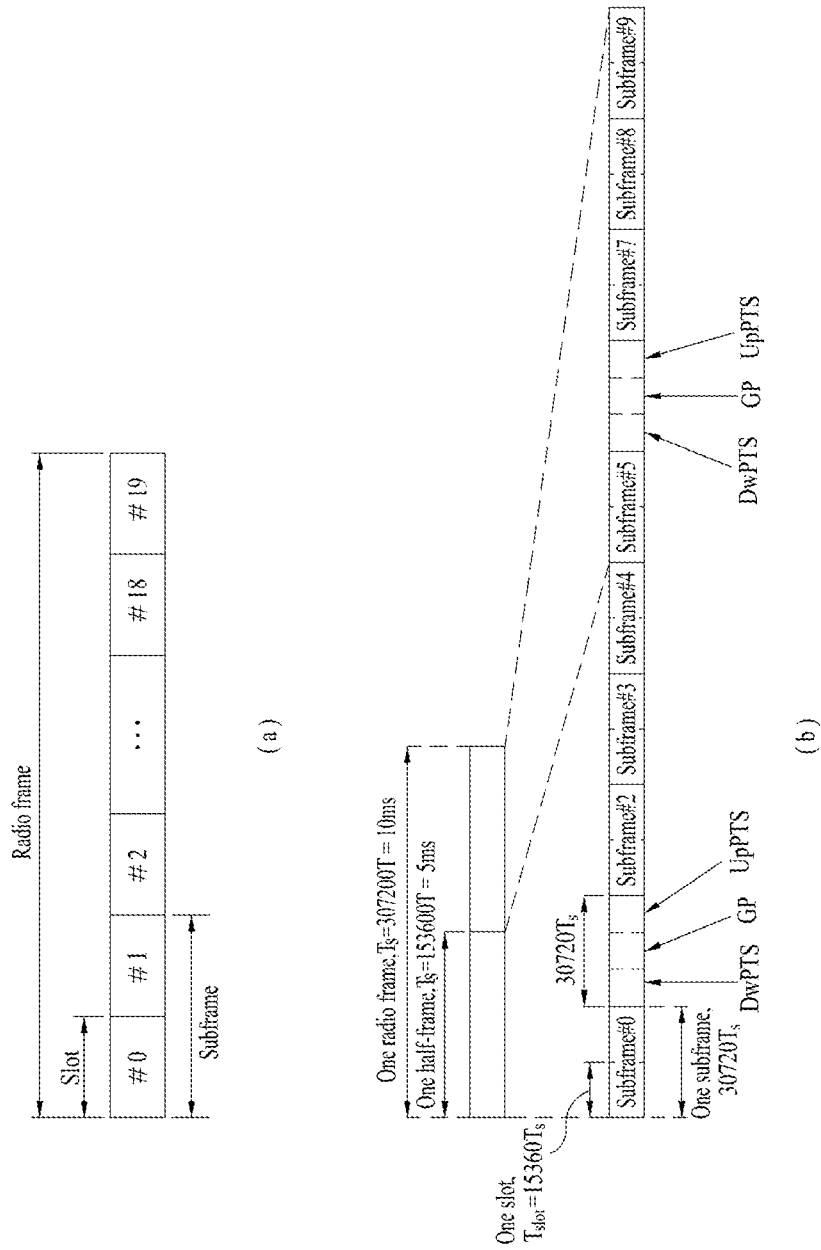
FIG. 1 is a diagram for an example of a radio frame structure used in a wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | | Normal cyclic prefix in downlink | | | Extended cyclic prefix in downlink | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
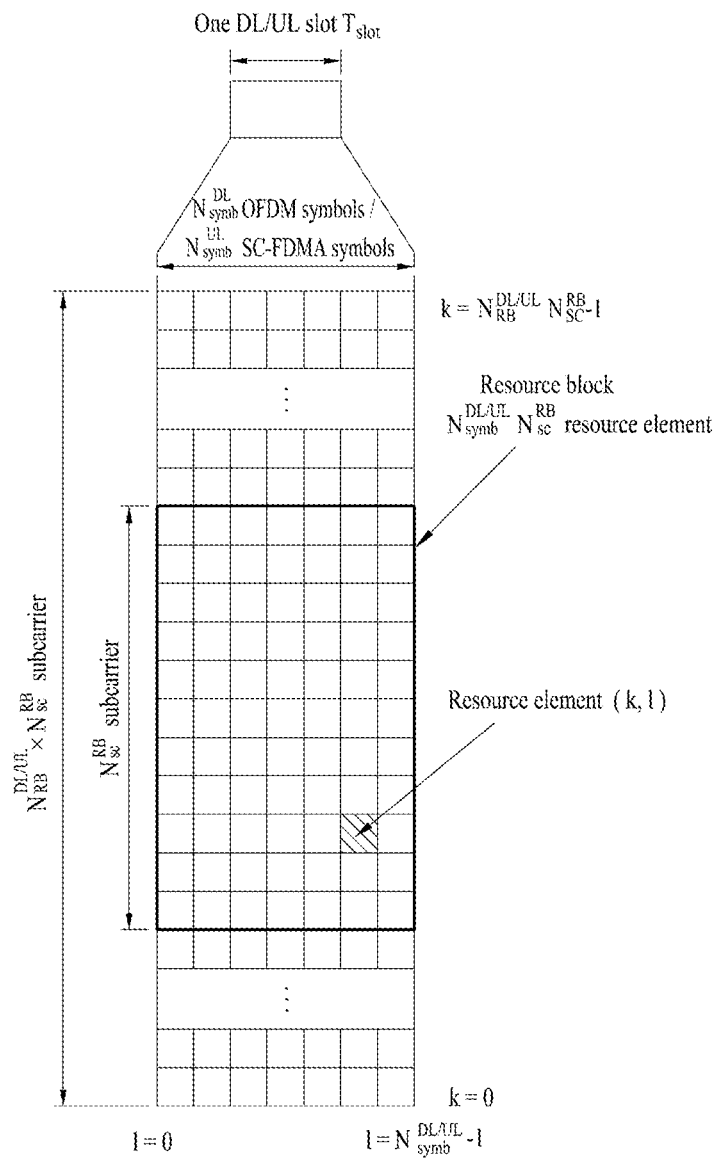
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
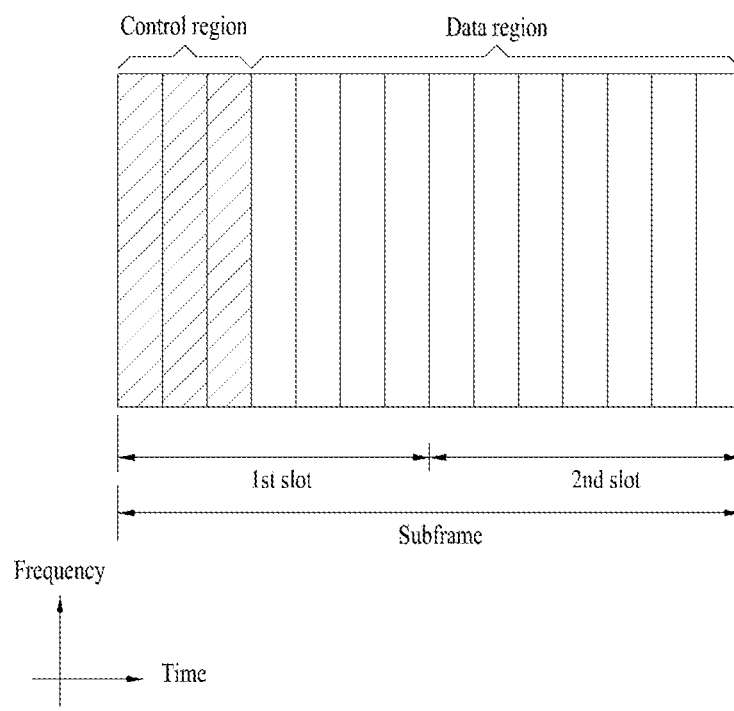
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PC-FICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)—masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
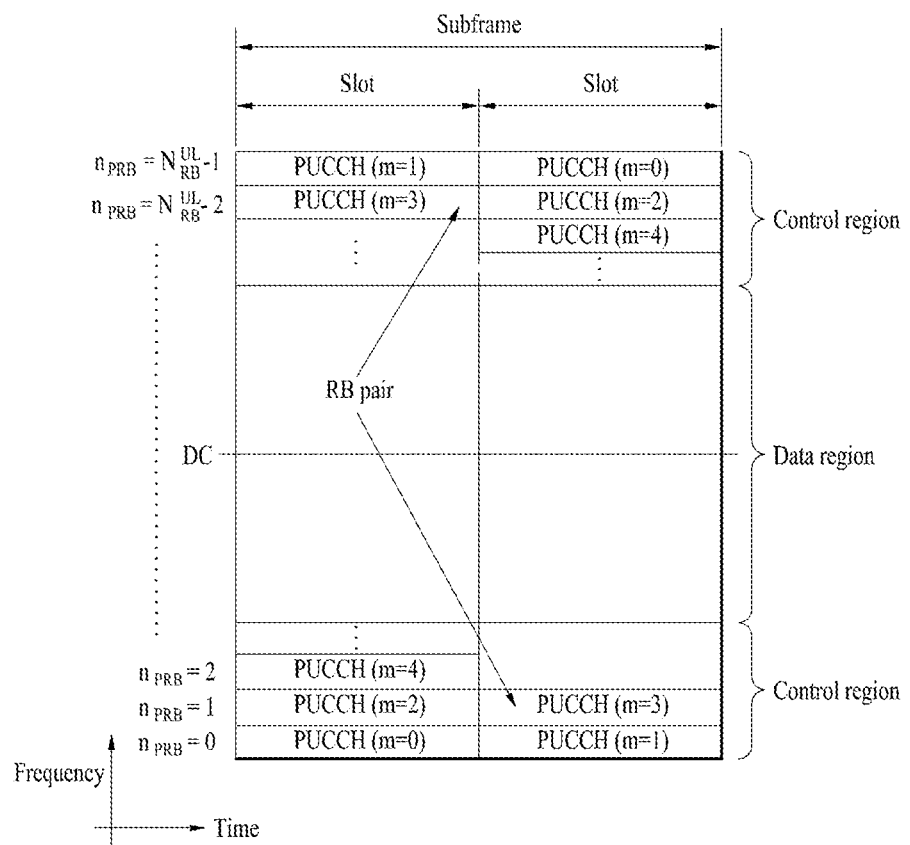
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MB SFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

Meanwhile, in the LTE-A system expected to include finer MU-MIMO and explicit CoMP operations, current CSI feedback is defined in LTE and cannot sufficiently support such operations to be newly employed. As the requirements for CSI feedback accuracy become complicated to obtain sufficient MU-MIMO or CoMP throughput gain, they agreed to configure PMI with two types of long term/wideband PMI ($W_1$) and short term/subband PMI ($W_2$). So to speak, final PMI is expressed as a function of $W_1$ and $W_2$. For example, final PMI W may be defined as follows: $W=W_1*W_2$ or $W=W_2*W_1$. Hence, in LTE-A, CSI shall be configured with RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 7, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH after Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
|---|---|---|---|---|
| | | No PMI | Single PMI | Multiple PMIs |
| PUSCH QCI Feedback Type | Wideband (Wideband CQI) | | | Mode 1-2 RI 1st wideband CQI(4 bit) 2nd wideband CQI(4 bit) if RI > 1 N*Subband PMI(4 bit) (N is the total # of subbands) (if 8Tx Ant, N*subband W2 + wideband W1) |
| | UE selected (Subband CQI) | | Mode 2-0 RI (only for Open-loop SM) | Mode 2-2 RI 1st wideband CQI(4 bit) + Best-M |

TABLE 6-continued

| | PMI Feedback Type | | |
|---|---|---|---|
| | No PMI | Single PMI | Multiple PMIs |
| | 1st wideband CQI(4 bit) + Best-M CQI(2 bit) (Best-M CQI: An average CQI for M SBs selected from among N SBs) Best-M index (L bit) | | CQI(2 bit) 2nd wideband CQI(4 bit) + Best-M CQI(2 bit) if RI > 1 Best-M index (L bit) |
| | | | Wideband PMI(4 bit) + Best-M PMI(4 bit) (if 8Tx Ant, wideband W2 + Best-M W2 + wideband W1) |
| Higher Layer-configured (Subband CQI) | Mode 3-0 RI (only for Open-loop SM) 1st wideband CQI(4 bit) + N*subbandCQI(2 bit) | Mode 3-1 RI 1st wideband CQI(4 bit) + N*subbandCQI(2 bit) 2nd wideband CQI(4 bit) + N*subbandCQI(2 bit) if RI > 1 Wideband PMI(4 bit) (if 8Tx Ant, wideband W2 + wideband W1) | Mode 3-2 RI 1st wideband CQI(4 bit)+ N*subbandCQI(2 bit) 2nd wideband CQI(4 bit) + N*subbandCQI(2 bit) if RI > 1 N*Subband PMI(4 bit) (N is the total # of subbands) (if 8Tx Ant, N*subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/ PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

| | | PMI feedback type | |
| --- | --- | --- | --- |
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 7, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

ix) Type 7: the UE transmits a CRI (CSI-RS resource indicator) and an RI.

x) Type 8: the UE transmits a CRI, an RI and a WB PMI.

xi) Type 9: the UE transmits a CRI, an RI and a PTI (precoding type indication).

xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

If a carrier aggregation (CA) environment is considered, a 2-bit CSI request field is used in DCI format 0 or 4, for an aperiodic CSI feedback in the current LTE standards. If a plurality of serving cells are configured for a UE in the CA environment, the UE interprets the CSI request field in 2 bits. If one of TM 1 to TM 9 is configured for every component carrier (CC), an aperiodic CSI feedback is triggered according to values listed in Table 8 below. If TM 10 is configured for at least one of all CCs, an aperiodic CSI feedback is triggered according to values listed in Table 9 below.

TABLE 8

| Values of CSI request field | Description |
| --- | --- |
| '00' | Aperiodic CSI reporting is not triggered |
| '01' | Aperiodic CSI reporting is triggered for serving cell |
| '10' | Aperiodic CSI reporting is triggered for a first set of serving cells configured by higher layer |
| '11' | Aperiodic CSI reporting is triggered for a second set of serving cells configured by higher layer |

TABLE 9

| Values of CSI request field | Description |
| --- | --- |
| '00' | Aperiodic CSI reporting is not triggered |
| '01' | Aperiodic CSI reporting is triggered for CSI process set configured for serving cell by higher layer |
| '10' | Aperiodic CSI reporting is triggered for a first set of CSI processes configured by higher layer |
| '11' | Aperiodic CSI reporting is triggered for a second set of CSI processes configured by higher layer |

NR (New Radio Technology)

Although the structure, operation or function of the 3GPP LTE (-A) system has been described in the above description, the structure, operation, or function in the 3GPP LTE (-A) in the NR is slightly modified, Can be set. Let me briefly explain some of them.

In NR, various numerology (numerology) are supported. For example, subcarrier spacing (subcarrier spacing) is supported not only at 15 KHz, but also up to 2n times (n=1, 2, 3, 4).

The number of OFDM symbols per slot (hereinafter simply referred to as "symbol") is fixed to 14, but the number of slots in one subframe is 2k (k=0, 1, 2, 3, 4, 5). However, it is the same as the existing LTE system that the radio frame is composed of 10 subframes. In case of extended CP, the number of symbols per slot is fixed to 12, and one subframe consists of 4 slots. In addition, like the existing LTE system, one resource block is defined as 12 consecutive subcarriers in the frequency domain.

Also, the purpose (for example, downlink, uplink, or flexible) of each symbol in a slot is defined according to the slot format, and both the downlink symbol and the uplink symbol can be set in one slot, And this case is referred to as a self-contained subframe (or slot) structure.

In the present specification, in an environment of communication using a number of antenna ports like NewRAT, when multi-stage CSI for reducing overhead is used, each stage configured with RS and feedback type is defined and a signaling method for configuring it for a UE and signaling it to the UE dynamically is proposed.

In NewRAT-NIMO (NR-MIMO) using a number of antenna ports, multi-stage CSI is considered to reduce overhead of feedback. In this case, each stage of the multi-stage CSI is defined as a pair of an RS for CSI and a feedback type. To this end, configuration can be given as follows.

One CSI process may include one or more stage configurations.

One stage configuration may correspond to a pair of one CSI reporting configuration and one RS configuration.

One stage configuration may include a plurality of feedback types.

A feedback type may include information such as information indicating what kind of feedback information is transmitted, feedback timing (or a range of a feedback timing value that can be designated as DCI), a CSI calculating method (e.g., explicit method or implicit method), frequency granularity (e.g., wideband, partial band, or subband), etc.

RS configuration may include a plurality of candidates of RS pattern that can be designated as DCI and the like by a UE and contain information indicating that a corresponding RS pattern is transmitted in which period p and through which subframes k. In this case, a total time length for transmitting the corresponding RS may amount to p*k subframes.

The above CSI process, stage configuration and informations included therein may be configured for a UE by higher layer signaling such as RRC signaling and the like.

One feedback type may apply to a plurality of stage configurations. For example, although different RSs (e.g., a plurality of CSI-RSs of precoding different from BRS) are defined from an analog beam selection stage and a digital beam selection stage, respectively, feedback on each stage may include feedback of all beam indexes. In this case, mapping between port/beam index of each RS and feedback index may be defined for each RS. For example, a beam index 0 to be fed back may correspond to a lowest port/beam index. In this case, BRS may correspond to beam indexes 0 to 7 to be fed back by ports 0 to 7, respectively. And, Beam Refinement Reference Signal (BRRS) may correspond to beam indexes 0 to 7 to be fed back by ports 600 to 607, respectively.

The following purposes may be considered for each CSI stage.

1. Analog beam selection: Selecting an analog beam that is used by a BS.

2. Digital Beam selection: This is the step of designating ports amounting to the number of ports (e.g., the number of TXU) to be actually used for data transmission to a UE when a BS has antenna ports more than TXU of the BS.

3. CSI acquisition: CSI calculation/reporting to be actually used for data transmission by a UE 4. Partial band selection: This is the step of determining and restricting a partial band to be used for data transmission by a UE. In this case, the UE may be scheduled within a corresponding partial band only.

5. CSI tracking: CSI calculation/reporting on a corresponding partial band under partial band restriction The partial band restriction in the above partial band selection and CSI tracking may be used for dedicated partial band reporting per service by a BS. So to speak, in case of the partial band selection, a BS may configure a specific UE to calculate/report CSI of a partial band (e.g., partial band for eMBB, URLLC, or MTC) for each service in order to acquire CSI for a partial band corresponding to a service to be used by the specific UE. In the CSI racking, the BS may configure the specific UE to transmit RS on a partial band dedicated to a UE only through selection of CSI acquired from the above scheme, MIB/SIB, higher layer signaling or the like and calculate and report CSI on the corresponding partial band only.

Moreover, the partial band restriction in the above partial band selection and CSI tracking may mean a scheme that a subband scheduled to a UE by a BS may be used continuously until transmission of data is finished or there is a separate update in aspect of resource allocation using a subband CSI. This scheme is also usable for a per-service dedicated partial band reporting. To this end, a subband should be defined in partial band unit. Namely, 'subband=partial band' is defined or a plurality of subbands may be defined within a single partial band. Namely, a single band is not defined across two partial bands.

Besides the above example, it is able to consider an additional purpose for a BS to determine a data transmission scheme (e.g., CQI, precoding, transmission layer) to use for a UE.

3.1 CSI Stage

Multi-stage CSI is configured with a plurality of CSI stages. As each CSI stage, an RS feedback type pair in the following may be considered.

① A plurality of wideband RS, CRI (CSI-RS resource indicator) (beam index reporting) of different precoding ② Wideband CSI including a plurality of wideband RS and CRI of different precoding ③ Subband CSI including a plurality of wideband RS and CRI of different precoding ④ Wideband RS, wideband CSI ⑤ Wideband RS, subband CSI ⑥ Partial band RS, wideband CSI ⑦ Partial band RS, subband CSI ⑧ Wideband RS, partial band CSI ⑨ A plurality of analog beams, BSI (beam selection index)

Although a CSI stage considered by considering the number of RS and the frequency granularity of RS in RS aspect and the property of frequency granularity of feedback in aspect of feedback type, other property may be additionally considered as follows.

RS aspect
RS type—BRS, BRRS, RRM-RS, DMRS, etc.
Cell-specific/UE-specific RS
Frequency feedback aspect
Periodic/aperiodic CSI feedback
Explicit/implicit feedback
long/short reporting timing
Precoding information/channel quality information/layer number information, etc.

In each CSI stage, a UE may calculate CSI on a designated feedback type using a designated RS and report it to a BS using a designated feedback resource (e.g., time-frequency resource).

In this case, a partial band RS corresponds to a scheme of transmitting RS for the entire designated partial band. This may be the same as a per-service dedicated partial band. Or, when a separate update exists simply after subband scheduling in a BS or it is intended to make data transmission on a corresponding subband until the end of data transmission, it may be the same as the corresponding subband.

So to speak, it may be defined as
partial band: a band for a specific service on which a UE is currently working within a wideband.
subband: a band on which a UE may be scheduled within a partial band.

Or, as a partial band may correspond to a frequency resource differing in system numerology such as TTI, subframe/slot length, subcarrier spacing, etc. to support a different service from a physical layer viewpoint, it may be defined as follows.

Partial band: A largest bandwidth supported by a UE having the same numerology (e.g., subframe/slot length, TTI, subcarrier spacing, etc.) within a wideband.

Particularly, since information on a service among the aforementioned definitions of partial band may not be configured for a UE explicitly, a scheme of substantially defining a partial band for a UE: 1) includes a band configured within a band having the same numerology; and 2) enables UE's control channel monitoring and/or substantial data scheduling to be performed within the corresponding partial band. So to speak, a separate partial band (i.e., partial band CSI-RS/IMR) is defined for a band having a different numerology, and CSI calculating/reporting should be also independently performed on each partial band similarly.

In this case, as a partial band CSI-RS is semi-static in frequency resource fluctuation property, it may be configured in advance through higher layer signaling (e.g., RRC signaling). As a subband CSI-RS needs to be designated dynamically according to a BS traffic situation, it may be dynamically designated through L1 signaling or L2 signaling such as DCI. Yet, regarding a resource candidate that can carry a subband CSI-RS, such a candidate is configured in advance through higher layer signaling such as RRC signaling and the subband CSI-RS may be then triggered on or off dynamically through L1/L2 signaling.

For example, through RRC signaling, it is able to configure partial band configuration information (e.g., PRB start index and PRB last index) and subband configuration information (e.g., subband size: N PRBs). In this case, if the subband configuration information is determined by a determined rule, it may be excluded from signaling. For example, a subband bandwidth may be determined as N PRBs according to N (where N is a natural number) determined based on a system bandwidth, a UE-specific wideband bandwidth or a partial band bandwidth. Thereafter, information indicating what kind of subband CSI-RS is transmitted within a partial band may be included in aperiodic CSI-RS triggering DCI in form of a bitmap. Similarly, the bitmap information may be included in CSI-RS on/off DCI on semi-persistent CSI-RS transmission.

Moreover, the concept of a bandwidth part is newly introduced. With respect to a partial band CSI-RS, a partial band may be equal to a bandwidth part. Besides, one or more bandwidth part configuration may be configured per Component Carrier (CC) for a UE, and each bandwidth part is configured with a group of contiguous PRBs. Moreover, a bandwidth of the bandwidth part is equal to or smaller than a maximum bandwidth (performance) supported by a UE but is equal to or greater than a Synchronization Signal (SS) bandwidth used for beam management at least. Such configuration of the bandwidth part may include numerology, frequency position (e.g., center frequency) or bandwidth.

Each bandwidth part is associated with specific numerology (e.g., subcarrier spacing, CP type, etc.), and a UE expects that at least one DL bandwidth part and at least one UL bandwidth part in a set of the configured bandwidth parts will be activated at a given timing. The UE is assumed as performing transmission/reception within the activated DL/UL bandwidth part(s) using the associated numerology.

Particularly, a wideband RS, a partial band RS and a subband RS may be defined separately. Namely, they may be divided into three layers of a wideband RS, a partial band RS and a subband RS. The subband RS has the same granularity of the subband CSI. Namely, a plurality of subband RSs may be defined within an RS defined partial band or wideband.

If a UE is unable to monitor the whole system bandwidth, i.e., the UE has capability of using a portion of a system band only, the wideband may mean a maximum bandwidth configured for the UE to use. If a UE is a UE for a specific service only, a wideband RS and a partial band RS of the UE may have the same frequency granularity. Namely, a wideband in a wideband RS may be defined as follows.

Wideband: The largest bandwidth supported by a UE

If carrier aggregation is considered, it is natural that CSI is individually defined per component carrier. Hence, the following definition may be more accurate.

Wideband: The largest bandwidth supported by a UE per component carrier

Or, a BS may set a band, which is equal to or smaller than a maximum frequency band usable by a UE, as a bandwidth candidate for receiving data, define such a band as one wideband, and configure it in unit of one CSI related operation. The wideband may be configured for a UE by a method such as System Information Block (SIB) or the like, or configured through higher layer signaling such as RRC signaling or the like for better flexibility. A plurality of the widebands may be configured within a maximum bandwidth that may be supported by the UE. In this case, the respective widebands may overlap with each other. Hence, the wideband RS and the wideband CSI may be performed independently from RS transmission and CSI measurement/reporting operations for another wideband, as RS transmission and CSI measurement/reporting operations for the respective widebands configured for the UE. In this case, a plurality of partial bands configured with different numerologies may be defined individually within each wideband (available for both TDM and FDM), and a UE-side partial band defined within wideband may correspond to a portion of a partial band (e.g., a band having the same numerology) configured in aspect of a BS only. If single numerology is defined within the corresponding wideband, a wideband CSI and a partial band CSI may coincide with each other. If so, the partial band CSI (or, the reporting of the partial band CSI) may be skipped.

Typically, if a UE uses a specific operation (e.g., mMTC operation, data subband operation) only, e.g., if a UE operates on a specific partial band only, a BS may configure a wideband RS with the same frequency granularity of a partial band RS. So to speak, a frequency region occupied by each of a wideband and a partial band may have same size.

Particularly, a wideband may become a unit of a frequency band for transmitting control and/or data for a UE, and more typically, a unit for transmitting one Transport Block (TB). In this case, a partial band having a different numerology within a single wideband may not be FDMed or be assumed as not FDMed at a specific timing at least. Namely, a plurality of partial bands defined within a single wideband may be possibly TDMed with each other. For example, two partial bands, which have different subcarrier spacing or use a frequency band of the same size, may be defined within a wideband but are used at different timings, respectively.

For the above-described operation, a separate CSI process may be configured per wideband. Namely, independent CSI-RS or CSI reporting configuration is given in unit of 'wideband', and CSI-RS's transmission and measurement/reporting operation are independently performed. In this case, CSI on a plurality of widebands may be reported on a single UL resource.

For the purpose of beam management or Radio Resource Management (RRM) measurement, a BS may transmit CSI-RS on a whole band viewable by a UE. To this end, the BS transmits a plurality of wideband CSI-RSs that cover a whole band of interest, thereby using it for the usage of beam management or RRM measurement. Or, by defining a sort of 'super-wideband' as a maximum frequency band usable by a UE or a whole system bandwidth of a carrier, the BS may transmit CSI-RS for the super-wideband. Regarding a UE operation for the corresponding CSI, if the UE supports a bandwidth of the super-wideband, a reference resource may refer to a bandwidth within a single timing (e.g., slot). If a UE is unable to support a whole bandwidth at a time, a reference resource of the super-wideband may include aggregation across partial bandwidth through several timings (e.g., slot).

Or, a wideband means a frequency band on which a control channel is transmitted, and may target a frequency band on which a control channel is scheduled instead of a frequency band on which data is scheduled. Namely, a wideband RS may be transmitted by targeting the control channel scheduled frequency band or a CSI targeting the corresponding band may be defined as a wideband CSI. If a data transmitted band is different from a control channel transmitted band, a UE reports and uses a CSI for a control channel through a wideband CSI, thereby performing a further stable control channel transmission.

In each CSI calculation, a UE is assumed as having numerology having the same target band (e.g., subcarrier spacing, TTI size).

As a structure similar to an RS for CSI mentioned in the foregoing description, RS for interference measurement (i.e., CSI-Interference Measurement (CSI-IM)) may be defined. Namely, wideband CSI-IM/partial band CSI-IM/subband CSI-IM may be defined as granularity for CSI-IM and included in the following stage. Particularly, as one RS and a plurality of CSI-IMs are included in each stage, it is able to report CSI on multi-interference assumption. In a manner similar to that of a case of RS for CSI, a B S may inform a UE of such a target band of interference measurement on CSI by higher layer signaling such as RRC signaling semi-statically in case of a partial band CSI-IM or by L1 signaling such as DCI dynamically in case of a subband CSI-IM.

In this case, CSI-IM may have frequency granularity different from that of RS for CSI. Namely, wideband/partial band/subband configuration for IM may be set different from wideband/partial band/subband configuration for CSI-RS resource. Here, when configuration for CSI measurement is set for a UE, combination of CSI-RS and CSI-IM having different frequency granularities is possible. For example, subband RS for CSI and partial band CSI-IM are accompanied or RS for CSI on different subband sizes and CSI-IM are defined and accompanied.

In addition, considering the CSI reporting in the above-defined wideband/partial band/subband unit, frequency granularity for CSI reporting may be set independently from CSI-RS or CSI-IM. Moreover, combination of different granularities is possible. For example, it is possible to indicate a subband CSI reporting using wideband CSI-RS and partial band CSI-IM.

When the frequency granularity for the CSI-RS, CSI-IM and CSI reporting is set, as RF of a transceiving end in case of TDD is generally implemented in a manner of being shared, it is possible to provide a rule such that wideband CSI configuration and/or partial band CSI configuration is always set identical to each other.

In the above description, in case of 'partial band RS, wideband CSI', wideband CSI means CSI for a corresponding partial band (i.e., a whole region in which a partial band RS is transmitted).

So to speak, when it is intended to make a partial band CSI reporting, separate partial band configuration information is not included in CSI reporting configuration and band configuration of Non-Zero Power (NZP) CSI-RS may be followed identically. For example, when CSI reporting configuration 1 connected to resource configuration 1 (together with bandwidth part 1) and CSI reporting configuration 2 connected to resource configuration 2 (together with bandwidth part 2) are used for a UE, it is able to calculate/report CSI on the bandwidth part 1 and CSI on the bandwidth part 2. In such a case, a BS may dynamically instruct a UE of CSI reporting configuration corresponding to a bandwidth part to be calculated.

Resource configuration for a plurality of bandwidth parts may be set for one CSI reporting configuration. For example, resource configuration 1 (together with bandwidth part 1) and resource configuration 2 (together with bandwidth part 2) may be included in one CSI reporting configuration. In such a case, CSI on a plurality of partial bands for the CSI reporting configuration may be simultaneously calculated/reported. Or, a BS dynamically instructs a UE of a specific resource, thereby instructing the UE to calculate/report CSI on a specific bandwidth part.

In doing so, regarding subband CSI, a plurality of subbands are defined within an RS defined partial band or wideband and CSI on each subband is calculated and reported. For example, it may mean a following scheme. First of all, as an eMBB partial band is defined, when a specific UE is set to use a corresponding partial band/service, several subbands are defined within the eMBB partial band. Hence, the UE calculates and reports CSI in unit of the corresponding subband.

Figure 5:
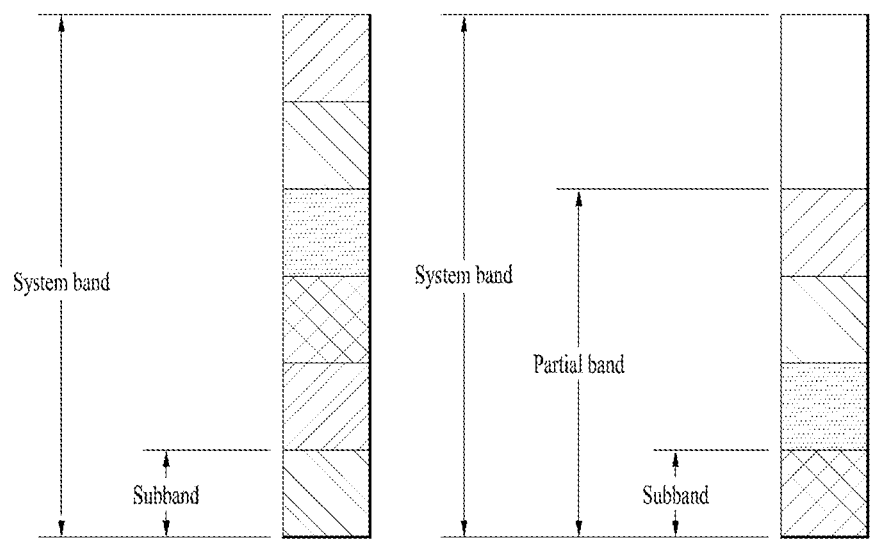
FIG. 5 shows the relationship among a system bandwidth, partial band and subband.

FIG. 5 shows the relationship among a system bandwidth, partial band and subband.

As a CSI stage in the following, a multi-stage CSI of one of 2 CSI stages may be considered.

Stage 1. Digital beam selection: ① A plurality of wideband RSs and CRIs of different precoding Stage 2. CSI acquisition: ④ Wideband RS, wideband CSI Or, for subband scheduling/CSI, 2 stages may be defined as follows.

Stage 1. Digital beam selection: ① A plurality of wideband RSs and CRIs of different precoding Stage 2. CSI acquisition: ⑤ Wideband RS, subband CSI Or, two or more purposes may be defined in one CSI stage as follows.

Stage 1. Beam acquisition and CSI acquisition: ③ Subband CSI including a plurality of wideband RSs and CRIs of different precoding Stage 2. CSI acquisition: ⑤ Wideband RS, subband CSI Or, one stage may be defined across a plurality of subframes.

Stage 1. Beam acquisition and CSI acquisition: ⑤ Wideband RS, subband CSI (transmitted in a plurality of subframes together with RS beamformed differently at different timing)

Stage 2. CSI acquisition: ⑤ Wideband RS, subband CSI

Like this example, for a UE, it is also possible to identically define the RS property and feedback operation according to a stage.

Or, after subband scheduling, if a UE uses partial band restriction that transmission keeps being performed on a scheduled subband, the following can be defined.

Stage 1. Beam acquisition and CSI acquisition: ① A plurality of wideband RSs and CSIs of different precoding Stage 2. CSI tracking: ⑥ Partial band RS, wideband CSI Or, when the above scheme (partial band restriction using a subband CSI), 3 CSI stages may be defined.

Stage 1. Beam acquisition and CSI acquisition: ① A plurality of wideband RSs and CRIs of different precoding Stage 2. CSI acquisition: ⑤ Wideband RS, subband CSI Stage 3. CSI tracking: ⑥ Partial band RS, wideband CSI Or, when it is intended to use a per-service dedicated partial band and select a service/partial band using a partial band CSI through a wideband RS, 3 stages may be defined as follows.

Stage 1. Digital beam selection: ① A plurality of wideband RSs and CRIs of different precoding Stage 2. Partial band selection: ⑧ Wideband RS, partial band CSI Stage 3. CSI tracking: ⑥ Partial band RS, wideband CSI Or, selection of an analog beam may be included in a mult0stage CSI process.

Stage 1. Analog beam selection: ⑨ A plurality of analog beams and BSIs

Stage 2. Digital beam selection: ① A plurality of wideband RSs and CRIs of different precoding Stage 3. CSI tracking: ⑤ Wideband RS, subband CSI 3.2 DCI Signaling for CSI Stage 'CSI stage trigger' may be defined for an operation of each stage (i.e., RS transmission instruction and aperiodic CSI request) and transmitted to a UE. For example, when 3 CSI stages for the above-described per-service dedicated partial band are defined, 2-bit CSI stage trigger is transmitted on DCI and the following state may be defined for each state.

TABLE 10

| State | Process |
| --- | --- |
| 00 | No trigger |
| 01 | Stage I. Digital beam selection - Multiple wideband RS with different precoding, CRI |
| 10 | Stage II. Partial band selection - Wideband RS, subband selection |
| 11 | Stage III. CSI tracking - Partial band RS, wideband CSI |

To this end, the following contents may be transmitted from a BS to a UE by being included in DCI.

1. A Plurality of RS Indications

A. Bitmap: An RS set corresponding to each bit of a bitmap is designated, and a BS may transmit it by setting a bit, which corresponds to the RS set to transmit, to 1. A UE may read the corresponding bitmap and measure an RS corresponding to each bit designated as 1.

B. RS Number Indication:

A plurality of RS patterns are set for a UE through higher layer signaling such as RRC signaling and an index is given to each RS pattern. If the RS number is signaled to the UE through DCI, the UE may measure CSI using RS resources amounting to the corresponding RS number by starting with a minimum index number (e.g., 1).

C. Signaling Plural/Single RS Indication Only:

A plurality of RS patterns are set for a UE through higher layer signaling such as RRC signaling, and a BS uses plural/single RS indicator to indicate whether all of the RSs configured at the corresponding timing or a single RS configured by the BS is used. The corresponding RS configuration may be set for the UE through another DCI content, or CSI may be measured using a beam index for data transmission or an RS corresponding to the beam index.

2. RS for CSI Indication

A. Bitmap:

An RS set corresponding to each bit of a bitmap is designated, and a BS may transmit it by setting a bit, which corresponds to the RS set to transmit, to 1. A UE may read the corresponding bitmap and measure an RS corresponding to each bit designated as 1.

B. RS Index Indication:

A BS sets a plurality of RS patterns for a UE through higher layer signaling such as RRC signaling and gives an index to each RS pattern. The BS signals an RS index to the UE through DCI, and the UE may measure CSI using an RS corresponding to the corresponding index.

C. Signaling Plural/Single RS Indication Only:

A BS sets a plurality of RS patterns for a UE through higher layer signaling such as RRC signaling. And, the BS uses plural/single RS indicator to indicate whether all of the RSs configured at the corresponding timing or a single RS configured by the BS is used. The corresponding RS configuration may be set for the UE through another DCI content, or CSI may be measured using a beam index for data transmission or an RS corresponding to the beam index.

3. RBs for RS Transmission (Case of Using Narrow Band RS)

A. Start RB-End RB:

ABS may give an index for each RB and inform a UE of an RS starting RB index and an RS ending RB or an RB length. The BS may directly inform the UE of the RB index. Or, the BS may give an index to a start RB-end RB pair set and inform the UE of the corresponding index.

B. Rb Bitmap:

An RB corresponding to each bit of a bitmap is designated. A BS may set a bit corresponding to an RB, on which an RS will be transmitted, to 1 and transmit it. A UE may read the corresponding bitmap and measure RS from the RB corresponding to each bit designated as 1. In this case, a narrow band may be designated instead of RB.

C> Narrow band index: ABS may give an index to a narrowband each and inform a UE of an index for a narrow band on which an RS will be transmitted.

4. RS Transmission Opportunity

A. With reference to a reception timing of a corresponding DCI, a UE may be informed that an RS designated by one of the schemes 1 to 3 is transmitted at which timing.

B. Particularly, it may be informed that an RS having the same resource configuration is transmitted in a plurality of subframes. This may be usable in a situation like the stage of the above-mentioned 'Beam acquisition and CSI acquisition: ⑤ Wideband RS, subband CSI (transmitted in a plurality of subframes together with RS beamformed differently at different timing)'. Like the class B of FD-MIMO, this is usable for a situation that ports more than the TXU number of a BS is shown to a UE or a situation that it is intended to show RS for a plurality of analog beams to the UE.

In this case, a transmission timing m of CSI-RS in the CSI stage trigger for a plurality of CSI-RSs may be defined as follows.

A fixed timing m may be defined in advance.

A fixed timing m may be included in a CSI process, stage configuration, or RS configuration.

A range of m may be determined in advance. Through the CSI stage trigger, an m value within the corresponding range may be designated to a UE.

A range of m may be included in a CSI process, stage configuration, or RS configuration. Through the CSI stage trigger, an m value within the corresponding range may be designated to a UE.

The meaning of the m value may be described as follows.

Figure 6:
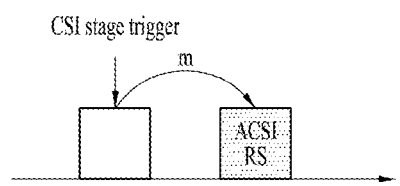
FIGS. 6 to 13 show an interval between a CSI stage trigger and aperiodic CSI-RS transmission.

'm' is an interval (or distance) from a CSI stage trigger to A-CSI-RS. This is shown in FIG. 6.

If a plurality of A-CSI-RSs are transmitted, the meaning of the m value may be the same as follows.

Figure 7:
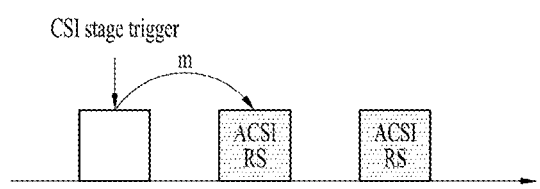

'm' is an interval (or distance) from a CSI stage trigger to a first A-CSI-RS. This is shown in FIG. 7.

Figure 8:
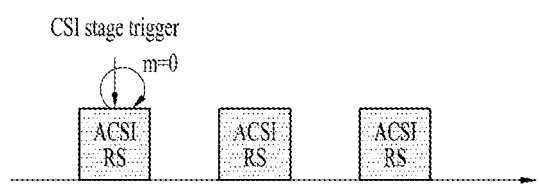

Particularly, the first A-CSI-RS may be transmitted in the same subframe of DCI including the corresponding indication. This case is identical to a case of being defined as the fixed value m=0 in advance. FIG. 8 shows a case of m=0.

Figure 9:
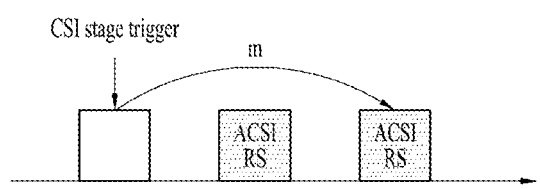

'm' is an interval (or distance) from a CSI stage trigger to a last A-CSI-RS. This is shown in FIG. 9.

Like this case, if A-CSI-RS is not transmitted in a subframe such as a CSI stage trigger, the $i^{th}$ among total M A-CSI-RS timings may become m/M*i subframe, where i=1, 2, 3 . . . .

Particularly, if A-CSI-RSs having different usages/properties (e.g., A-CSI-RS for channel measurement, A-CSI-RS for interference measurement) are used for one CSI and a timing of an aperiodic CSI reporting is designated to a related RS timing, a scheme of designating a transmission timing of A-CSI-RS to a timing of an RS transmitted last among different A-CSI-RSs is advantageous for securing time for calculation of CSI.

Figure 10:
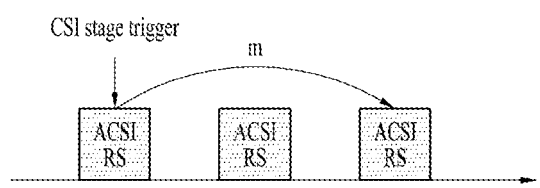

Or, if A-CSI-RS is transmitted in a subframe such as a CSI stage trigger, an m/(M−1)*i subframe (where i=0, 1, 2, 3 . . . ) may be used as the $i^{th}$ among total M A-CSI-RS timings. FIG. 10 shows an example that a CSI stage trigger and an A-CSI-RS are transmitted in the same subframe. In this case, 'm<0' may be defined. if so, a previously transmitted A-CSI-RS may be notified to a UE through a CSI stage trigger after the corresponding A-CSI-RS transmission.

Moreover, if a plurality of A-CSI-RSs are transmitted, a transmission timing interval p of A-CSI-RS may be indicated as follows.

If 'm' means an interval from a CSI stage trigger to a first CSI-RS, it may become 'p=m' without separate settings.

A fixed timing p may be defined in advance.

A fixed timing p may be included in a CSI process, stage configuration, or RS configuration.

A range of p may be determined in advance. Through the CSI stage trigger, a p value within the corresponding range may be designated to a UE.

A range of p may be included in a CSI process, stage configuration, or RS configuration. Through the CSI stage trigger, a p value within the corresponding range may be designated to a UE.

Particularly, if CSI-RSs are consecutively transmitted, it is identical to the case of being defined in advance as the above-fixed value p=1.

If a plurality of A-CSI-RSs are transmitted, the meaning of the p value may be described as follows.

Interval subframe number between the respective A-CSI-RSs

Figure 11:
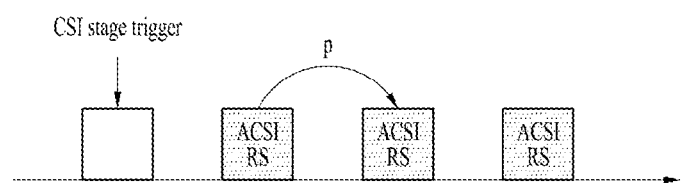

FIG. 11 shows 'p' that indicates an interval between the respective A-CSI-RSs.

Interval subframe between an initial A-CSI-RS and a last A-CSI-RS

Figure 12:
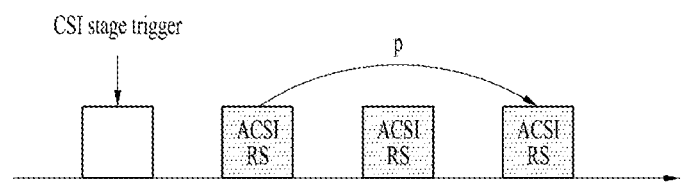
Figure 13:
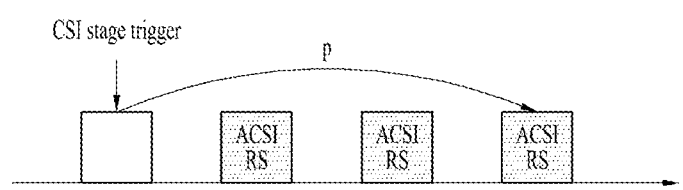

FIG. 12 shows 'p' that indicates an interval between an initial A-CSI-RS and a last A-CSI-RS.

In this case, the $i^{th}$ among total M A-CSI-RS timings may be transmitted in (first A-CSI-RS transmission timing)+p/(M−1)*(i−1) (where i=1, 2 . . . ) subframe.

Interval subframe between a CSI stage trigger and a last A-CSI-RS

FIG. 12 shows 'p' that indicates an interval between a CSI stage trigger and a last A-CSI-RS. In this case, the $i^{th}$ among total M A-CSI-RS timings may be transmitted in p/M*i (where i=1, 2 . . . ) subframe.

Regarding the above-described schemes, A-CSI-RSs (e.g., A-CSI-RS for channel measurement, A-CSI-RS for interference measurement) having different usages/properties are used for one CSI derivation. If a timing of an aperiodic CSI reporting is designated to a related RS timing, a transmission timing designation scheme for each A-CSI-RS may use a different scheme among the above-described RS timing indication schemes. Particularly, when two A-CSI-RSs are used, an earlier RS of the two is transmitted at a CSI stage trigger timing so as to be understood as 'm=0' and a later RS of the two may transmit a timing for A-CSI-RS only.

5. UL Resource Used for CSI Feedback

A. PUSCH Resource Allocation i. Non-scheduling resource indication (e.g., PUCCH) may be considered.

B. Report Timing Indication

With reference to a received timing of a corresponding DCI, a UE may be informed that a UL resource for a CSI reporting is designated at which timing.

Thus, as A-CSI-RS for one or a plurality of CSI-RSs are transmitted, if a CSI stage trigger for a corresponding RS is transmitted from a BS to a UE and received, the BS may designate a CSI feedback timing k for the UE to report an aperiodic CSI on the corresponding CSI stage trigger by the following method.

A fixed timing k may be defined in advance.

A fixed timing k may be included in a CSI process, stage configuration, or RS configuration.

A range of k may be determined in advance. Through the CSI stage trigger, a k value within the corresponding range may be designated to a UE.

A range of k may be included in a CSI process, stage configuration, or RS configuration. Through the CSI stage trigger, a k value within the corresponding range may be designated to a UE.

The meaning of the k value may be described as follows.

Figure 14:
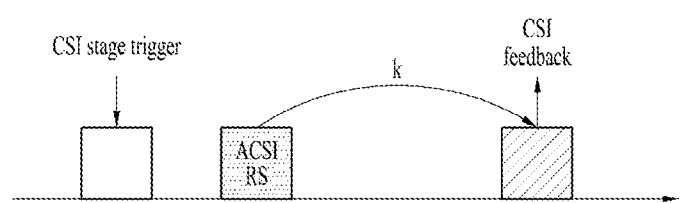
FIGS. 14 to 18 show an interval between a CSI stage trigger and CSI feedback.

A k value is an interval (or distance) from A-CSI-RS to a CSI feedback timing. This is shown in FIG. 14.

Since calculation of aperiodic CSI is performed after receiving A-CSI-RS, this is a scheme suitable for securing time for the calculation of the aperiodic CSI.

Figure 15:
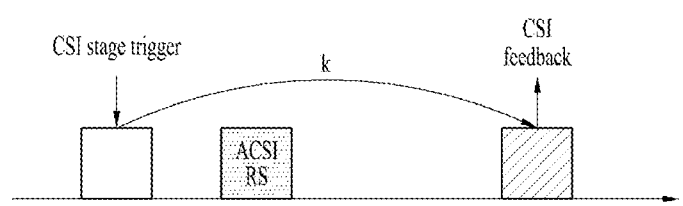

A k value is an interval (or distance) from a CSI stage trigger to a CSI feedback timing. This is shown in FIG. 15.

If a plurality of A-CSI-RSs are transmitted, the meaning of the k value may be described as follows.

Figure 16:
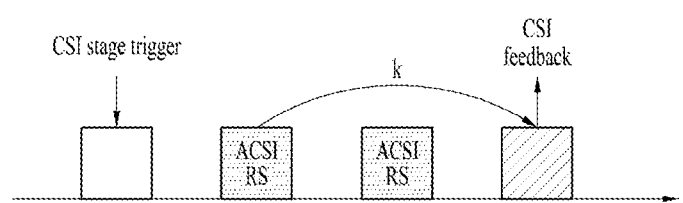

A k value is an interval (or distance) from a first A-CSI-RS. This is shown in FIG. 16.

Although a specific A-CSI-RS for aperiodic CSI calculation is transmitted at a plurality of timings, in such a case of receiving a CSI stage trigger at the timing that the transmission of a plurality of the A-CSI-RSs does not start yet, a scheme that a CSI feedback timing indicates a timing from a transmission timing of an initial A-CSI-RS is valid.

Figure 17:
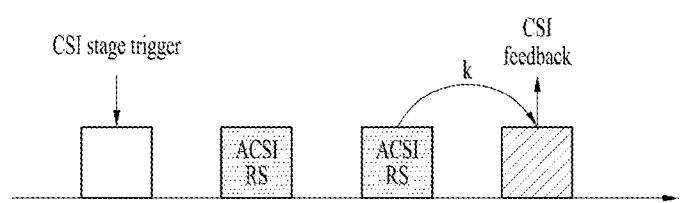

A k value is an interval (or distance) from a last A-CSI-RS to a CSI feedback timing. This is shown in FIG. 17.

Particularly, if A-CSI-RSs having different usages/properties (e.g., A-CSI-RS for channel measurement, A-CSI-RS for interference measurement) are used for one CSI and a timing of an aperiodic CSI reporting is designated to a related RS timing, a scheme of designating a transmission timing of A-CSI-RS to a timing of an RS transmitted last among different A-CSI-RSs is advantageous for securing time for calculation of CSI.

So to speak, a case that a plurality of aperiodic RSs are used for calculation of aperiodic CSI (e.g., A-CSI-RS for channel measurement and aperiodic CSI-IM (Interference Measurement) for interference measurement)) is the appropriate example for the above scheme. In this case, a scheme that a k value designates a distance from the latest transmitted RS among a plurality of RSs is appropriate. Namely, since it is difficult to be dynamically aligned with different Transmission and Reception Points (TRPs), an NZP-CSI-RS transmission timing for inter-cell interference measurement and a transmission timing of A-CSI-RS for channel measurement may be misaligned with each other. This is noticeable between two TRPs that use different UL/DL configurations in particular.

More specifically, assuming that a timing point at which a UE receives a CSI stage trigger (similarly, an aperiodic CSI trigger) triggering an aperiodic CSI reporting is n and that a transmission timing point of an $i^{th}$ RS among CSI-RSs (NZP-CSI-RS for channel measurement and CSI-IM for interference measurement (e.g., including NZP-CSI-RS and ZP-CSI-RS)) used for calculation of a corresponding CSI with reference to the timing point n is mi, an aperiodic CSI reporting timing point may become may be a timing point (n+max(mi, 0)+k). In the max(mi, 0), '0' is an example including a case of 'a k value is a distance from a CSI stage trigger' that will be described later. This may be used for a situation that it is intended to indicate a CSI calculation time with reference to a reception timing point of a corresponding signaling in case that A-CSI-RS (or A-CSI-IM) is transmitted before a CSI stage trigger timing point.

Each mi described above may be understood differently in case of a different A-CSI-RS transmission scheme (e.g., one-shot A-CSI-RS or a plurality of A-CSI-RSs). For example, regarding one-shot A-CSI-RS and a plurality of A-CSI-RSs, one-shot A-CSI-RS may mean an interval (or distance) from a corresponding A-CSI-RS and a plurality of A-CSI-RSs may mean an interval (or distance) from a last RS transmission timing point of A-CSI-RS. Particularly, before transmission of a plurality of A-CSI-RSs starts, if a UE receives the CSI stage trigger, the corresponding mi may mean a timing from a first RS. After the transmission of a plurality of A-CSI-RSs has ended, if the UE receives the CSI stage trigger, the corresponding mi may mean a timing from a last RS.

Figure 18:
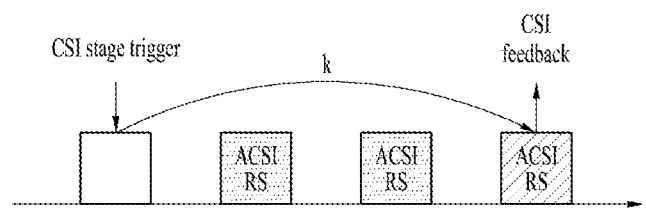

A k value is an interval (or distance) from a CSI stage trigger to a CSI feedback timing point. This is shown in FIG. 18.

ii. In a situation that a measurement result of one RS is excessively large, a UE may report the corresponding measurement result in a manner of dividing it through a plurality of subframes.

A report timing interval q of an aperiodic CSI in a CSI stage trigger for a plurality of A-CSI-RSs may be indicated as follows.

A fixed timing q may be defined in advance.

A fixed timing q may be included in a CSI process, stage configuration, or RS configuration.

A range of m may be determined in advance. Through the CSI stage trigger, a q value within the corresponding range may be designated to a UE.

A range of m may be included in a CSI process, stage configuration, or RS configuration. Through the CSI stage trigger, a q value within the corresponding range may be designated to a UE.

The q value may have the following meaning.

Figure 19:
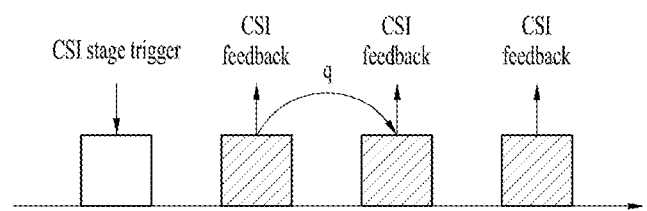
FIGS. 19 to 21 show intervals among a CSI stage trigger, aperiodic CSI-RS transmission and CSI feedback.

An interval (or distance) from a CSI stage trigger to an aperiodic CSI reporting. This is shown in FIG. 19.

Figure 20:
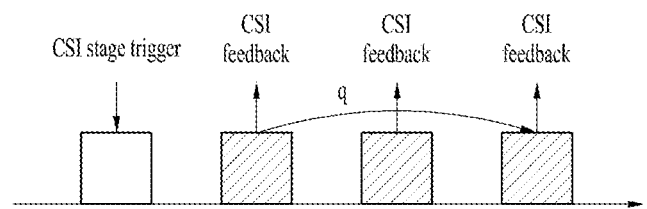

An interval (or distance) between an initial aperiodic CSI reporting and a final aperiodic CSI reporting. This is shown in FIG. 20.

Figure 21:
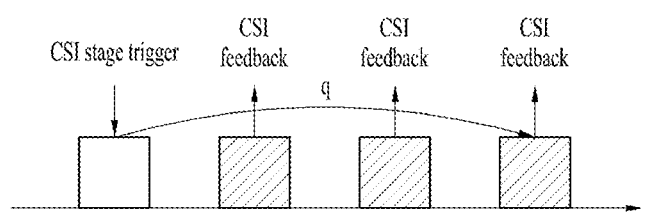

An interval (or distance) between a CSI stage trigger and a last aperiodic CSI reporting. This is shown in FIG. 21.

Or, if an operation that an RS is transmitted in a plurality of subframes is designated through a corresponding DCI, a UE may report CSI on the corresponding RS each. In this case, 'q=p' may be set.

iii. In this case, UL resource allocation may be identically applicable to each report timing.

Namely, a UE may calculate CSI by measuring an RS designated to the above DCI and report the corresponding CSI through a UL resource (time, frequency) designated to the above DCI.

According to another embodiment of the present disclosure, it is also possible to define a CSI stage including a transmission of CSI-RS only without CSI reporting. For example, there may be a CSI-RS transmission requiring no CSI reporting, e.g., CSI-RS for UE-side beam adjustment. In this case, a UE may configure a Tx and/or Rx beam of its own using CSI-RS transmitted by a BS without making a mean management related report such as CRI using the corresponding CSI stage. Moreover, it may be able to define a CSI stage for configuring a separate RS transmission to use for calculation of a CSI that will be calculated at a different timing point. For example, in order to calculate/report CSI using NZP CSI-RS based IMR for inter-TRP interference measurement difficult to be aligned with a CSI-RS transmission timing transmitted on its cell due to being transmitted in another TRP, CSI-RS is transmitted in advance separately from a CSI stage including an NZP CSI-RS based IMR-CSI reporting for inter-TRP interference measurement. On the contrary, in order to calculate CSI using an NZP CSI-RS based IMR from another TRP transmitted at a specific timing point together with NZP CSI-RS to be transmitted at another timing point, a UE may be informed of a transmission of an NZP CSI-RS based IMR for inter-TRP interference measurement separately from a CSI stage including an NZP CSI-RS-CSI reporting.

In case of a CSI stage in which RS is transmitted irrespective of a CSI reporting, a UE may be configured to buffer a measurement result of the corresponding RS in order to use the corresponding RS for a job to be used (e.g., CSI calculation). In a way, in case of a CSI stage not including CSI reporting setting, a result of the corresponding RS measurement may be automatically buffered until used for a next job. In this case, the corresponding RS may be used when a next CSI stage report is performed. Or, the corresponding RS may be used to report a CSI stage containing a separate configuration indicating 'configuration for RS for another CSI stage'.

Or/and, in case of intending to use an RS, which is included in a CSI stage having no CSI reporting setting, for a CSI reporting included in another CSI stage, the corresponding CSI stage may be set as 'inter-CSI stage report' to be distinguished from a scheme of UE beam adjustment requiring no CSI reporting, which may be included in the report setting of the corresponding CSI stage. If an RS transmitted at a previous timing point and unused for a CSI reporting exists at a specific CSI reporting start timing point (e.g., an RS measurement timing point or a CSI calculation start timing point) (moreover, if a subsequent RS valid interval is defined and does not expire), the above operation may be understood as using the corresponding RS in a manner of adding it to the CSI stage. The usage of the corresponding RS (e.g., CSI-RS or CSI-IM) may be configured together with resource settings, and more particularly, with 'inter-CSI stage report'.

Moreover, in order that an RS measurement result transmitted through another CSI stage is included in CSI calculation, a corresponding CSI stage may include RS setting. Or, in order to clarify such an operation, 'inter-CSI stage RS report' may be configured, which may be included in the RS setting of the corresponding CSI stage. In this case, if there is an RS not reported as transmitted previously, a CSI reporting is performed by including the corresponding RS. Otherwise, a CSI reporting may be performed using an RS included in a CSI stage of its own only or the corresponding report may be skipped. When inter-CSI stage dependency is not limited to a transmission of a previously transmitted RS only, if an additional RS is transmitted from another CSI stage later, a CSI reporting of the corresponding CSI stage may be performed using a measurement of the corresponding RS.

In the above case, as 'RS valid interval' is defined, it is able to inform a UE of a time usable for a CSI reporting (of another CSI stage) by buffering the above RS measurement result, which may be defined in advance or included in the corresponding RS configuration/CSI stage configuration. If the RS valid interval expires, the RS measurement result may be regarded as not existing previously. Moreover, if the corresponding CSI stage includes 'inter-CSI stage RS' configuration, CSI including an RS included in the corresponding CSI stage only may be reported or the corresponding CSI reporting may be skipped. Particularly, according to the RS purpose (e.g., beam management, CSI reporting), the value or a range of a settable value may be defined differently.

As described above, in inter-CSI stage dependency exists, the aforementioned CSI reporting timing may be defined with reference to a CSI stage corresponding to a last transmitted RS. For example, a CSI reporting timing may be defined with reference to a last transmitted RS transmission/reception timing. Moreover, instead of separately configuring an RS transmitted in another CSI stage in a CSI stage actually used for CSI calculation, a CSI stage triggered with a DCI transmitted at a timing of transmitting the corresponding RS may be regarded as calculating CSI including a previously transmitted RS. Namely, when CSI stage #1 includes RS setting only without a CSI reporting and CSI stage #2 includes report setting only without separate RS setting, DCI for triggering the CSI stage #2 may be transmitted in a corresponding slot as soon as an RS is transmitted in an RS transmission opportunity designated in the CSI stage #1. In this case, regarding a CSI reporting of the CSI stage #2, a CSI may be calculated/reported using an RS transmitted at the same time of the timing of transmitting the corresponding DCI. In this case, the DCI for triggering the CSI stage #1 may include DL-related DCI. Moreover, the 'RS transmission opportunity' designated in the CSI stage #1 may mean a transmission opportunity of a DCI that will indicate (a CSI reporting of) a CSI stage to use the corresponding RS simultaneously.

A CSI stage mentioned in the present specification may be understood as a scheme similar to 'measurement setting' currently discussed in NR MIMO. For example, one RS—report set configured as linking 'resource setting' and 'report setting', which are configured separately, at 'measurement setting' may be understood as referring to the concept similar to a CSI stage in the present specification. Additionally, for better flexibility, it is also possible to perform the link between the resource setting and the report setting through MAC signaling.

An RS resource indication field is defined within a DCI, and the corresponding field may be interpreted differently according to the above CSI stage indication. For example, an RS resource indication field of total 8 bits is defined. In case of CSI stage trigger=01 (i.e., a plurality of RS modes), it may be interpreted as a bitmap designating an RS configuration among a plurality of RS configurations of total 8 RRC configured types. In case of CSI stage trigger=10 (i.e., single RS mode), it may be interpreted as one of total 64 RRC configured RS patterns (2 bits reserved). In case of CSI stage trigger=11 (i.e., partial band RS mode), it may be interpreted as designating one of total 64 RS patterns and one of 4 partial bands.

By configuring a 1-bit CSI trigger instead of the CSI stage trigger and setting an expiration timer for each stage (i.e., an RS-feedback type pair), it is able to select whether to perform RS measurement/feedback on a which stage according to presence or non-presence of excess of the corresponding expiration timer at every aperiodic RS indication/aperiodic CSI request timing. For example, when total 2 stages are defined, if measurement/feedback on stage I is performed at a specific timing point in an environment that the expiration timer for the stage I is set to 5 ms, it is able to reset the expiration timer for the state 1 (e.g., timer=5). Thereafter, until the expiration timer expires (e.g., timer=0), all CSI triggers received by a UE may be interpreted as stage II. Thereafter, after expiration timer has expired, a CSI trigger received in the first may be interpreted as the stage I.

If a UE fails to receive a CSI stage trigger/CSI trigger of a BS, the BS may check whether the corresponding CSI stage trigger/CSI trigger is received by checking whether a CSI feedback is received on a which UL resource. In this case, the BS does not transmit a plurality of the CSI stage triggers/CSI triggers for a predetermined time (e.g., 4 ms) (particularly, when the stage using the expiration timer is triggered), and may expect that the UE will not receive two or more CSI stage triggers/CSI triggers for a predetermined time (e.g., 4 ms).

Or, in case of receiving two or more CSI stage triggers/CSI triggers for a predetermined time (e.g., 4 ms), the UE may report feedback on the initial CSI stage trigger/CSI trigger only.

A CSI-RS mentioned in the present specification is a reference signal used for calculation of a CSI and includes an NZP-CSI-RS for channel measurement and an NZP-CSI-RS for interference measurement and/or a ZP-CSI-RS, i.e., a CSI-IM. Moreover, as described above, in case that a different RS is designated in an RS configuration, it is obvious that the CSI-RS is usable for CSI calculation by being substituted with an RS (e.g., BRS, BRRS, RRM-RS, DMRS) of another type according to a configuration.

In the above description, in order to transmit 'stage index' through DCI instead of transmitting each information independently contained in DCI, each stage may be configured through L3 signaling such as RRC configuration. This configuration may include all or some of the above-described contents.

Or, for better flexibility, L2 signaling such as MAC is usable. In this case, in order to reduce overhead of MAC signaling, a range selectable by each content may be restricted. For example, candidates of selectable RE patterns are configured by RRC, and a pattern to be actually used among the candidates may be configured for each CSI stage through L2 signaling.

Measurement Restriction (MR) may be put on IMR. The existing MR considered in LTE is a scheme of setting whether a measurement result may be averaged time-wise, and NR continues a discussion on expanding it frequency-wise. Therefore, in the measurement of interference, it may be expanded to a scheme of setting a size and position of a resource group that may be regarded as having the same measurement value. A UE may consider a frequency resource unit that may average an interference measurement value based on the corresponding parameter.

When interference is measured, an interference signal coming into a corresponding IMR may include real data. Hence, it is preferable that the corresponding interference consists of resource units to which the same precoding is applied. In the existing LTE case, when interference of an adjacent cell is measured, a UE may be aware of a unit to which a different precoding is applied, i.e., a size of a Precoding Resource block Group (PRG) through a system bandwidth of the corresponding cell. Yet, in NR, since a PRB bundling size for precoding may be set, it is unable to implicitly know a PRB bundling size used by an adjacent cell. Hence, in NR, a UE may be informed on a Frequency-Measurement Restriction (F-MR) resource size for IMR. The UE may measure more accurate interference by averaging measurement values of interference within a designated F-MR resource. So to speak, the UE does not perform an operation of averaging and the like on the assumption that a measurement value in IMR included in a different F-MR resource is different. This may be more usefully usable to raise the accuracy of interference measurement in case such as an aperiodic IMR having difficulty in time-wise averaging.

ABS may inform a UE of an exact value of the F-MR resource size. In this case, a range of a configurable value may vary according to the property of an interference cell, e.g., a resource group size. Regarding a PRB bundling size of an interference cell that will be reflected by the F-MR resource, a range of a configurable/signaled value may be determined by a resource group size used by the corresponding interference cell. RBG, subband, wideband, system bandwidth size or the like may be considered as such a resource group. Particularly, the resource group size is preferably set to a value of an interference cell. To this end, a value of a resource group (e.g., wideband/subband/system bandwidth/RBG size) of the interference cell may be indicated.

Or, the F-MR resource size may be indicated based on a predetermined resource group size. For example, by defining F-MR resource size=RBG size/k, a corresponding k value may be set for a UE.

F-MR resource size may be configured through RRC signaling or signaled by MAC signaling. Particularly, when the F-MR resource size is indicated through MAC signaling, one of F-MR resource sizes designated in advance through RRC configuration is selected and configured for a UE. In case of configuring it through RRC signaling, a corresponding parameter may be set to a different F-MR resource size through IMR configuration or in unit of measurement setting.

A UE may be informed of the F-MR resource size through dynamic signaling. This may be included in aperiodic IMR indication, or a set of values that may be designated with DCI may be defined through RRC/MAC signaling for DCI overhead reduction.

By a scheme of transmitting F-MR resource signaling to a UE through DCI, as a content of a state of an aperiodic CSI trigger configured through RRC signaling, the corresponding F-MR resource size information may be included. For example, an F-MR resource size may be configured in addition to measurement setting (i.e., a set of channel measurement resource(s), interference measurement resource(s) and report setting(s)) for the aperiodic CSI trigger.

In case of a wideband IMR, a same F-MR resource is not defined across different partial bands. So to speak, although an F-MR resource is configured as a same F-MR resource due to an F-MR resource parameter, if the corresponding F-MR resource is located across a plurality of partial bands, a UE regards two F-MR resource parts as different F-MR resources, respectively. if a service or/and numerology (e.g., symbol duration, subcarrier size) of a corresponding band is different, such a partial band may be set as a different partial band. And, such a partial band of an interference cell may be configured for the UE. Particularly, since such information may be configured separate from IMR configuration or F-MR configuration, an F-MR resource may be defined according to the corresponding information.

Moreover, F-MR resource signaling may be transmitted to a UE together with F-MR signaling. So to speak, in addition to F-MR on/off, an F-MR resource size may be configured for a UE as follows.

1 RB unit (MR on)/configured F-MR resource #1 unit/configured F-MR resource #2 unit/wideband unit (MR off)

In the above example, F-MR resource #1/F-MR resource #2 may be configured for a UE through higher layer signaling such as RRC/MAC. Particularly, when an F-MR resource size is defined as one value through the above-described method, it may be signaled to a UE in 1 RB unit (MR on)/F-MR resource unit (MR off).

When an offset of PRB bundle (or, a PRB bundle (PRG, etc.) defined resource group), i.e., a different PRB bundle position is defined between two cells, a BS may configure the corresponding offset for a UE together with the F-MR resource size. Or, since this offset value may not change according to a time for the BS, this may be configured independently from the F-MR resource size. In this case it may be configured through higher layer signaling such as RC and the like.

If precoding is maintained time-wise during a predetermined time interval, e.g., n subframes due to the use of time-wise precoder cycling or the like, the above-described scheme may be similarly usable on a time axis as well.

Meanwhile, in NR, BandWidth Part (BWP) is defined as follows.

One or more bandwidth part configurations for each component carrier may be signaled to a UE semi-statically.
  A bandwidth part is configured with a group of contiguous PRBs.
    Reserved resources may be configured within a bandwidth part.
  A bandwidth of a bandwidth part is equal to or smaller than maximum bandwidth performance supported by a UE.
  A bandwidth of a bandwidth part is equal to an SS block bandwidth size at least.
  A bandwidth part may or may not include an SS block.
  Configuration of a bandwidth part may include the following property.
    Numerology
    Frequency position (e.g., center frequency)
    Bandwidth (e.g., PRB number)
  This is for a UE in RRC connected mode.
  Discussion will be made on indicating how to make assumption for resource allocation at a timing point of giving a which bandwidth part configuration (if a plurality of bandwidth part configurations exist) to a UE.

Neighbor cell Radio Resource Management (RRM) will be discussed later.

Each bandwidth part is associated with a specific numerology (subcarrier spacing, CP type).

A UE expects at least one DL bandwidth part and one UL bandwidth part activated in a set of bandwidth parts configured for a given time instant.

A UE is assumed as receiving/transmitting the following within the activated DL/UL bandwidth part(s) using the associated numerology.

At least PDSCH for DL and/or PDCCH and/or PUSCH for UL

Discussion will be made on whether a plurality of bandwidth parts having the same or different numerology may be activated for a UE simultaneously.

This may not mean that a UE is requested to support different numerologies simultaneously.

Discussion will be made on mapping RB to bandwidth part.

An activated DL/UL bandwidth part is not assumed to occupy a frequency range greater than DL/UL bandwidth performance of a UE in component carrier.

Essential mechanism for enabling a UE to RF-retune for bandwidth part switching is specified.

Moreover, it is agreed that a partial band may be equal to or smaller than a bandwidth part.

For partial band CSI-RS, a partial band may be equal to a bandwidth part.

Discussion will be made on whether a partial band has a value smaller than a bandwidth of a bandwidth part.

Therefore, the aforementioned partial band information may be substituted with a BandWidth Part (BWP) index. So to speak, as a configuration parameter of resource setting for NZP CSI-RS/CSI-IM or the like and/or a configuration parameter for a CSI reporting, a BWP index may be included. Moreover, for configuration of an RS having a bandwidth smaller than that of a BWP within the corresponding BWP, the resource setting for the NZP CSI-RS/CSI-IM or the like or the report setting for the CSI reporting may additionally include a start/end RB index within the corresponding BWP, or a start RB index and an RB length.

The main object of the aforementioned partial band CSI-RS/IMR/CSI is to calculate or report an independent CSI according to each service/numerology when different services/numerologies are multiplexed within the same wideband. In NR phase 1, one BWP is determined to be activated and used at a time only, which is applied in a manner of selecting a BWP to use from a plurality of BWPs configured for a UE in advance by dynamic BWP switching.

When the above dynamic BWP switching is used, since a CSI not on an activated BWP designated to a UE but on an inactive BWP is not meaningful while the corresponding BWP is not used, significance of the CSI-RS/IMR/CSI reporting configured for the inactive BWP is lowered relatively. Therefore, a BS and UE automatically select to use a CSI-RS/IMR/CSI reporting configured for the same BWP as the designated activated BWP among the previously configured/selected CSI-RS/IMR/CSI reporting. Particularly, in case of a semi-static resource/report such as a periodic resource/report, it is advantageous in aspect of saving latency for separate RRC configuration. Similarly, when the activated BWP is changed, the existing enabled semi-persistent resource/report may operate in a manner of being assumed as disabled automatically.

This is similarly applicable to a case that a plurality of CSI-RS/IMR/CSI reporting exist per BWP. So to speak, a CSI-RS/IMR/CSI reporting becoming a designation target of MAC CE or/and DCI signaling may become CSI-RS/IMR/CSI reporting configured for the same BWP of the activated BWP designated at the very timing point. So to speak, an index of a resource intended to be designated by DCI/MAC signaling may be used in a manner of being automatically rearranged/redefined (e.g., in order of the existing indexes) within a resource designated for the corresponding BWP. To this end, a UE performs a CSI measurement/reporting operation for the CSI-RS/IMR/CSI reporting on the designated BWP.

In case of intending to calculate a CSI on a BWP other than a BWP designated to a UE, a BS needs to designate a CSI measurement target BWP. Moreover, for CSI measurement on an inactive BWP, a BS designates a separate measurement gap and measures/reports a CSI not on an activated BWP but on another inactive BWP.

A case of using a measurement cap is described as follows.

A case that a center frequency of a UE needs to move to measure a corresponding BWP A case of intending to calculate a CSI on a BWP out of a maximum bandwidth of a UE A case that a corresponding BWP is defined with a numerology different from that of a currently activated BWP For such a case, a BS instructs a UE to perform measurement using a previously configured measurement gap. Assuming that there is no transmission of PDSCH/PUSCH in such a measurement gap, the UE attempts CSI measurement on a designated BWP. To this end, the UE attempts the measurement by changing a center frequency of its own and/or Fast Fourier Transform (FFT) size.

To this end, the BS may signal a BWP becoming a target of a CSI measurement/report to the UE. Such signaling may explicitly designate a target BWP index. Namely, such designation may be performed in a manner of triggering a CSI-RS/IMR/CSI reporting configured for an inactive BWP, or a CSI target BWP index may be designated in a separate DCI field. Thus, once a CSI measurement on an inactive BWP is triggered, the UE may perform the corresponding CSI measurement in a measurement gap first appearing after the trigger among the previously configured periodic/semi-persistent measurement gaps. Or, to this end, a dynamic measurement gap is defined. And, by triggering the defined measurement gap with a DCI, it is able to measure a CSI on an inactive BWP within the corresponding measurement gap. Such a dynamic measurement gap trigger may be joint-encoded with the aforementioned CSI target BWP (related) index. So to speak, when the BS gives an instruction of a CSI measurement on an inactive BWP, the UE operates without PDSCH reception/PUSCH transmission by assuming a measurement gap during a time designated to measure the corresponding CSI.

A periodic/semi-persistent gap may be configured as follows.

Frequency resource within a slot

Period/slot offset

Slot length

In case of a periodic measurement gap, a configured measurement gap appears in a predetermined period/offset. And, a CSI on another BWP is measured in the corresponding measurement gap each time it is necessary. In addition, a semi-persistent measurement gap may enable/disable the corresponding measurement gap through DCI and/or MAC signaling.

In an aperiodic measurement gap, a UE/BS operation may be agreed without the period/slot offset configuration among the aforementioned configurations or by ignoring the period/slot offset configuration. In this case, a measurement gap designated with a DCI may start at a timing point of receiving the corresponding DCI by the UE or a timing designated by the corresponding DCI.

For a case that there are too many measurement gap candidates to be designated with a DCI in the corresponding configuration and the like, it is able to select measurement gap(s) to use actually from the RRC-configured measurement gap set through MAC signaling.

Thus, besides the aforementioned 'scheme of explicit designation through DCI', as a scheme for a BS to signal a UE to perform a measurement within a measurement gap, it may be able to consider: 1) designating a measurement timing point within a (periodic/semi-persistent) measurement gap; or 2) using a DCI transmitted in a measurement gap used slot. So to speak, when a BS designates a timing point of performing an aperiodic CSI measurement within a measurement gap with a DCI, a UE assumes that a corresponding CSI reporting is measured for an inactive BWP and transmitted as well. If such a measurement timing point is equal to the DCI signaling timing point, a measurement (or report) trigger may be designated through a DCI transmitted in a time interval in which a corresponding measurement gap is configured. In such a case, the UE may assume that the corresponding CSI reporting is measured/transmitted for the inactive BWP. Therefore, a signaling target of the CSI-RS/IMR/CSI reporting in such a case may become all irrespective of a BWP. As a measurement target of the aforementioned aperiodic CSI measurement trigger, a periodic/semi-persistent CSI-RS/IMR may be indicated. In such a case, a CSI is measured/reported on the assumption that the corresponding resource is 'MR on'.

To this end, it is able to designate a separate DCI index table used inside/outside a measurement gap. So to speak, although DCI field states of a CSI-RS/IMR/CSI reporting designating a measurement in a normal situation target a resource for an active BWP only, if a measurement within a measurement gap is signaled, the corresponding DCI field states may limit a signaling target of the CSI-RS/IMR/CSI reporting to an inactive BWP (for less DCI signaling overhead) or become the whole irrespective of a BWP (for more flexibility).

If a measurement of a different BWP is previously set for a different timing within a corresponding measurement gap, e.g., for a slot, a measurement timing point of a corresponding CSI designated by a BS may be interpreted as a designation of a BWP corresponding to the corresponding slot simultaneously.

When a BWP indication is designated explicitly, configuration flexibility may be independently given for each CSI-RS/IMR/CSI reporting. Or, since all CSIs should be measured/reported for the same BWP, such a BWP indication may identically apply to the three kinds of CSI-RS/IMR/CSI reporting.

Regarding such a CSI reporting on a measurement gap, a CSI is reported on an available UL resource (e.g., PUSCH, long PUCCH) within a first activated BWP after getting out of the measurement gap.

Figure 22:
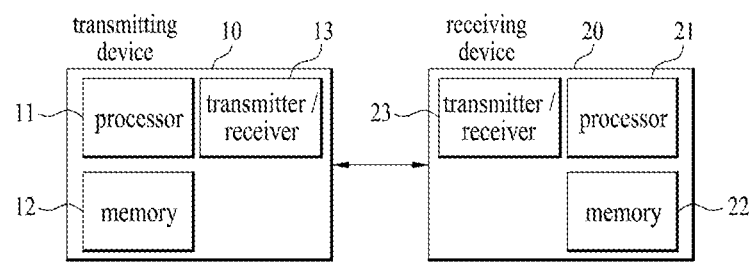
FIG. 22 is a block diagram for a device configured to implement embodiment(s) of the present disclosure.

FIG. 22 is a block diagram of a transmitting device 10 and a receiving device 20 configured to implement exemplary embodiments of the present disclosure. Referring to FIG. 9, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on uplink and as the receiving device 20 on downlink. In embodiments of the present disclosure, an eNB serves as the receiving device 20 on uplink and as the transmission device 10 on downlink.

The transmitting device and/or the receiving device may be configured as a combination of one or more embodiments of the present disclosure.

As one of the combinations of the above proposals, a user equipment performing a channel state report in a wireless communication system may include a transmitter, a receiver, and a processor configured to control the transmitter and the receiver. The processor may be configured to receive a channel state report configuration including an index of a first BandWidth Part (BWP), receive a trigger of a channel state report not on the first BWP but on a second BWP, measure a channel state on the second BWP in a measurement gap according to the trigger, and transmit the measured channel state on an available uplink resource within a first activated BWP after the measurement gap to a base station.

Moreover, a step of receiving information related to the measurement gap from the base station is further included, and the measurement gap may be defined by a frequency resource within a slot, a period/slot offset, or a slot length.

The measurement gap may include a first measurement gap after reception of the trigger among preset periodic or semi-persistent measurement gaps.

If the measurement cap is a semi-persistent measurement gap, the semi-persistent measurement gap may be enabled or disabled by signaling.

The trigger of the channel state report on the second BWP may include signaling that designates a measurement of the channel state within the measurement gap.

The trigger of the channel state report on the second BWP may include downlink control information received in the measurement gap configured slot.

And, the channel state report configuration may include a start RB index and an end RB index of the first BWP.

As mentioned in the foregoing description, the detailed descriptions for the preferred embodiments of the present disclosure are provided to be implemented by those skilled in the art. While the present disclosure has been described and illustrated herein with reference to the preferred embodiments thereof, it will be apparent to those skilled in the art that various modifications and variations can be made therein without departing from the spirit and scope of the disclosure. Thus, it is intended that the present disclosure covers the modifications and variations of this disclosure that come within the scope of the appended claims and their equivalents. For instance, the respective configurations disclosed in the aforesaid embodiments of the present disclosure can be used by those skilled in the art in a manner of being combined with one another. Therefore, the present disclosure is non-limited by the embodiments disclosed herein but intends to give a broadest scope matching the principles and new features disclosed herein.

INDUSTRIAL APPLICABILITY

The e present disclosure is usable for wireless communication devices such as a user equipment, a relay, a base station, etc.

What is claimed is:

1. A method for receiving a semi-persistent Channel State Information—Reference Signal (SP CSI-RS) by a user equipment (UE), the method comprising:
receiving first information for informing a SP CSI-RS resource being activated, wherein the SP CSI-RS resource is included in a first bandwidth part (BWP), and the first BWP is configured as an active BWP; and
receiving, in the first BWP, a SP CSI-RS through the SP CSI-RS resource;
wherein, based on the active BWP being changed from the first BWP to a second BWP indicated by a BWP indicator, the SP CSI-RS resource is deactivated without receiving second information for informing the SP CSI-RS being deactivated, and
wherein the first BWP is different from the second BWP.

2. The method of claim 1, wherein, based on the active BWP being changed from the second BWP to the first BWP after the SP CSI-RS resource is deactivated, the SP CSI-RS resource is activated.

3. The method of claim 1, wherein the SP CSI-RS is received in the first BWP after a specific time from a timing of receiving the first information.

4. The method of claim 1, wherein the first information is received via a Medium Access Control (MAC) signaling.

5. The method of claim 1, wherein a size of frequency resource for CSI measurement is informed via a Radio Resource Control (RRC) signaling.

6. A user equipment (UE) for receiving a semi-persistent Channel State Information—Reference Signal (SP CSI-RS), the UE comprising:
at least one transceiver;
at least one processor; and
at least one computer memory operably connectable to the at least one processor and storing instructions that, when executed by the at least one processor, perform operations comprising:
receiving, through the at least one transceiver, first information for informing a SP CSI-RS resource-being activated, wherein the SP CSI-RS resource is included in a first bandwidth part (BWP), and the first BWP is configured as an active BWP; and
receiving, in the first BWP through the at least one transceiver, a SP CSI-RS through the SP CSI-RS resource;
wherein, based on the active BWP being changed from the first BWP to a second BWP indicated by a BWP indicator, the SP CSI-RS resource is deactivated without receiving second information for informing the SP CSI-RS being deactivated, and
wherein the first BWP is different from the second BWP.

7. The UE of claim 6, wherein, based on the active BWP being changed from the second BWP to the first BWP after the SP CSI-RS resource is deactivated, the SP CSI-RS resource is activated.

8. The UE of claim 6, wherein the SP CSI-RS is received in the first BWP after a specific time from a timing of receiving the first information.

9. The UE of claim 6, wherein the first information is received via a Medium Access Control (MAC) signaling.

10. The UE of claim 6, wherein a size of frequency resource for CSI measurement is informed via a Radio Resource Control (RRC) signaling.

11. An apparatus for receiving a semi-persistent Channel State Information—Reference Signal (SP CSI-RS), the apparatus comprising:
    at least one processor; and
    at least one computer memory operably connectable to the at least one processor and storing instructions that, when executed by the at least one processor, perform operations comprising:
    receiving first information for informing a SP CSI-RS resource being activated, wherein the SP CSI-RS resource is included in a first bandwidth part (BWP), and the first BWP is configured as an active BWP; and
    receiving, in the first BWP, a SP CSI-RS through the SP CSI-RS resource;
    wherein, based on the active BWP being changed from the first BWP to a second BWP indicated by a BWP indicator, the SP CSI-RS resource is deactivated without receiving second information for informing the SP CSI-RS being deactivated, and
    wherein the first BWP is different from the second BWP.

12. A computer readable storage medium storing at least one computer program comprising instructions that, when executed by at least one processor, cause the at least one processor to perform operations, the operations comprising:
    receiving first information for informing a SP CSI-RS resource being activated, wherein the SP CSI-RS resource is included in a first bandwidth part (BWP) and the first BWP is configured as an active BWP; and
    receiving, in the first BWP, a SP CSI-RS through the SP CSI-RS resource;
    wherein, based on the active BWP being changed from the first BWP to a second BWP indicated by a BWP indicator, the SP CSI-RS resource is deactivated without receiving second information for informing the SP CSI-RS being deactivated, and
    wherein the first BWP is different from the second BWP.

13. A method of transmitting a semi-persistent Channel State Information—Reference Signal (SP CSI-RS) by a base station (BS), the method comprising:
    transmitting first information for informing a SP CSI-RS resource being activated, wherein the SP CSI-RS resource is included in a first bandwidth part (BWP), and the first BWP is configured as an active BWP; and
    transmitting, via the first BWP, a SP CSI-RS through the SP CSI-RS resource;
    wherein, based on the active BWP being changed from the first BWP to a second BWP indicated by a BWP indicator, the SP CSI-RS resource is deactivated without transmitting second information for informing the SP CSI-RS being deactivated disabled, and
    wherein the first BWP is different from the second BWP.

14. A base station (BS) for transmitting a semi-persistent Channel State Information—Reference Signal (SP CSI-RS), the BS comprising:
    at least one transceiver;
    at least one processor; and
    at least one computer memory operably connectable to the at least one processor and storing instructions that, when executed by the at least one processor, perform operations comprising:
    transmitting first information for informing a SP CSI-RS resource being activated, wherein the SP CSI-RS resource is included in a first bandwidth part (BWP), and the first BWP is configured as an active BWP; and
    transmitting, via the first BWP, a SP CSI-RS through the SP CSI-RS resource;
    wherein, based on the active BWP being changed from the first BWP to a second BWP indicated by a BWP indicator, the SP CSI-RS resource is deactivated without transmitting second information for informing the SP CSI-RS being deactivated, and
    wherein the first BWP is different from the second BWP.

* * * * *